(12) United States Patent
Bruns et al.

(10) Patent No.: US 11,976,927 B2
(45) Date of Patent: May 7, 2024

(54) TRANSPORTATION VEHICLE NAVIGATION METHOD

(71) Applicant: VOLKSWAGEN AKTIENGESELLSCHAFT, Wolfsburg (DE)

(72) Inventors: Christian Bruns, Braunschweig (DE); Tatjana Kruscha, Braunschweig (DE); Julia Kwasny, Wolfsburg (DE); André Oberschachtsiek, Braunschweig (DE); Bernd Rössler, Sassenburg (DE); Oliver Cassebaum, Wolfsburg (DE); Enes Esatbeyoglu, Braunschweig (DE); Jan Kempa, Wolfsburg (DE); Frank Schulze, Wolfsburg (DE)

(*) Notice: Subject to any disclaimer, the term of this patent is extended or adjusted under 35 U.S.C. 154(b) by 217 days.

(21) Appl. No.: 16/762,203

(22) PCT Filed: Oct. 26, 2018

(86) PCT No.: PCT/EP2018/079473
§ 371 (c)(1),
(2) Date: May 7, 2020

(87) PCT Pub. No.: WO2019/091805
PCT Pub. Date: May 16, 2019

(65) Prior Publication Data
US 2020/0355508 A1 Nov. 12, 2020

(30) Foreign Application Priority Data
Nov. 10, 2017 (DE) .................. 10 2017 220 033.2

(51) Int. Cl.
*G01C 21/34* (2006.01)
*G07C 5/00* (2006.01)
(Continued)

(52) U.S. Cl.
CPC ..... *G01C 21/3415* (2013.01); *G01C 21/3461* (2013.01); *G01C 21/3469* (2013.01);
(Continued)

(58) Field of Classification Search
CPC ........... G01C 21/3461; G01C 21/3469; G01C 21/3415
See application file for complete search history.

(56) References Cited

U.S. PATENT DOCUMENTS 8,903,646 B2  12/2014  Althen et al.
9,688,194 B2   6/2017  MacNeille et al.
(Continued)

FOREIGN PATENT DOCUMENTS

CN    1501309 A    6/2004
CN  106018210 A   10/2016
(Continued)

OTHER PUBLICATIONS

Search Report for International Patent Application No. PCT/EP2018/079473; Feb. 7, 2019.
(Continued)

*Primary Examiner* — Shelley Chen
(74) *Attorney, Agent, or Firm* — Barnes & Thornburg LLP

(57) ABSTRACT

A transportation vehicle navigation method with a navigation system of a transportation vehicle for determining at least one route and navigation based on the determined route according to a position of the transportation vehicle. The method includes detecting at least one environmental characteristic of the transportation vehicle, specific for at least one emission of the transportation vehicle, by at least one sensor of the transportation vehicle to determine a detection result; performing an evaluation of the detection result to
(Continued)

determine an evaluation result; and adapting the determined route during the navigation based on the evaluation result.

18 Claims, 2 Drawing Sheets

(51) Int. Cl.
*G07C 5/08* (2006.01)
*H04W 4/40* (2018.01)

(52) U.S. Cl.
CPC ........... *G07C 5/008* (2013.01); *G07C 5/0808* (2013.01); *H04W 4/40* (2018.02)

(56) References Cited

U.S. PATENT DOCUMENTS

| | | | |
|---|---|---|---|
| 2004/0093264 A1 | 5/2004 | Shimizu | |
| 2008/0059050 A1* | 3/2008 | Lin | G08G 1/0104 340/933 |
| 2010/0076675 A1* | 3/2010 | Barth | G01C 21/3469 701/532 |
| 2013/0080053 A1* | 3/2013 | Rakshit | G01C 21/3469 701/527 |
| 2013/0218427 A1* | 8/2013 | Mukhopadhyay | G06F 17/00 701/99 |
| 2014/0039988 A1 | 2/2014 | Londergan et al. | |
| 2014/0229255 A1* | 8/2014 | Scofield | G06Q 30/0207 705/14.1 |
| 2015/0153184 A1 | 6/2015 | Mudalige et al. | |
| 2017/0069205 A1 | 3/2017 | Nguyen et al. | |
| 2017/0076509 A1* | 3/2017 | Scofield | B64C 39/024 |
| 2017/0270368 A1 | 9/2017 | Gosch et al. | |

FOREIGN PATENT DOCUMENTS

| | | | | |
|---|---|---|---|---|
| CN | 107194409 A | | 9/2017 | |
| DE | 102007014684 A1 | | 2/2009 | |
| DE | 102010002348 A1 | | 8/2011 | |
| DE | 102014214277 A1 | | 2/2015 | |
| DE | 102014117751 A1 | | 6/2015 | |
| DE | 102014214455 A1 | | 1/2016 | |
| DE | 102016105135 A1 | | 9/2016 | |
| DE | 102015215325 A1 | | 2/2017 | |
| EP | 1300572 A2 | * | 4/2003 | ........... F02D 41/024 |
| EP | 2390861 A1 | | 11/2011 | |
| GB | 2516703 B | | 3/2020 | |
| JP | 2003004464 A | * | 1/2003 | |
| JP | 2009223514 A | | 10/2009 | |
| WO | 2015139788 A1 | | 9/2015 | |

OTHER PUBLICATIONS

Office Action; Chinese Patent Application No. 201880072313.4; Dec. 30, 2022.

* cited by examiner

TRANSPORTATION VEHICLE NAVIGATION METHOD

PRIORITY CLAIM

This patent application is a U.S. National Phase of International Patent Application No. PCT/EP2018/079473, filed 26 Oct. 2018, which claims priority to German Patent Application No. 10 2017 220 033.2, filed 10 Nov. 2017, the disclosures of which are incorporated herein by reference in their entireties.

SUMMARY

Illustrative embodiments relate to a method for transportation vehicle navigation using a navigation system of a transportation vehicle.

BRIEF DESCRIPTION OF THE DRAWINGS

Disclosed embodiments are described in detail with reference to the drawings. The features can each be essential to the disclosed embodiments individually or in any arbitrary combination. In the figures.

DETAILED DESCRIPTION

Figure 1:
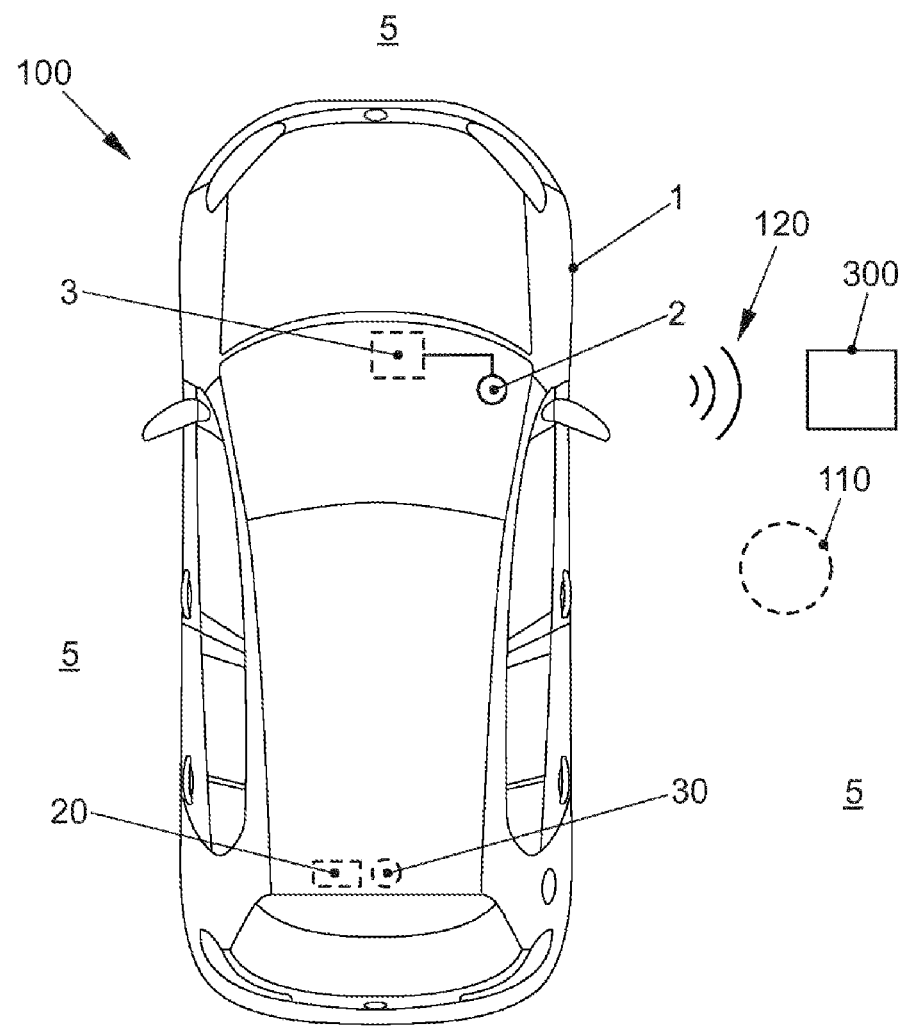
FIG. 1 shows a schematic top view of a transportation vehicle which carries out a disclosed method.

It is known that due to the increasing traffic density, in particular, in cities and metropolitan areas, the pollution due to transportation vehicle emissions increasing in this way is problematic. In particular, it will be necessary in the future to find solutions for reducing this pollution, wherein simultaneously maintaining or improving the mobility and infrastructure is desirable.

A traffic control which is based on a longer-term noise and/or air quality measurement is conventionally already performed.

A method and a system are known from US 2014/0039988 A1, which reward a driver of the transportation vehicle for using more environmentally-friendly routes.

A method for carrying out a traffic flow control is disclosed in DE 10 2007 014 684 A1.

A problem in this case is that because of the static nature of known traffic control solutions, high pollution values can nonetheless occur locally. It has also been shown that known solutions for traffic control can possibly be inflexible and unreliable. Disclosed embodiments at least partially reduce the above-described drawbacks. In particular, the disclosed embodiments propose an improved method for reducing the environmental pollution.

This is achieved by a method for transportation vehicle navigation. In this case, a navigation system is utilized which is used for ascertaining at least one route and for navigating on the basis of this ascertained route based on a location of a transportation vehicle. The navigation system can be integrated into the transportation vehicle in this case, for example, permanently connected to the transportation vehicle electronics. The transportation vehicle is, for example, a motor vehicle and/or a passenger automobile and/or an electric vehicle and/or the like.

It is possible in this case that the following operations are carried out, possibly in arbitrary sequence or in succession, wherein individual operations can also be repeated:

carrying out a detection of at least one environmental property (i.e., a detectable property, for example, physical variable, of an environment of the transportation vehicle), wherein the environmental property may be specific for at least one emission of the transportation vehicle, wherein the detection may be carried out by at least one sensor of the transportation vehicle, so that a detection result is determined, carrying out an analysis of the detection result, so that an analysis result is determined, carrying out a route adaptation of the ascertained route during the navigation on the basis of the analysis result.

The operations can optionally be carried out at least partially by the navigation system. It can be possible that to carry out the route adaptation, firstly a notification is output to a driver and/or the suitable (alternative) routes are displayed and/or a confirmation of the driver is required for the adaptation. A route refers to a proposal and/or specification for a route section of the transportation vehicle, which is used for destination guidance and/or for the planned movement of the transportation vehicle based on predetermined criteria. The predetermined criterion can be predetermined by a user (for example, fastest route, shortest route, route having the lowest environmental pollution). For this purpose, the route can comprise at least one computed route for the transportation vehicle, which takes into consideration, for example, a map material and/or traffic routes for the present location of the transportation vehicle.

A route comprises, for example, multiple partial routes, which can be associated with road sections to lead from a starting location to a destination location. Of course, different equivalent partial routes are usually available to reach the destination location, so that alternative routes also exist to the presently ascertained route (which are accompanied, for example, by a longer travel time or route section or the like).

The detection result is, for example, a measurement result, i.e., a quantitative statement about the environmental property. For example, a microphone (for volume measurement) and/or a particulate matter sensor (for measuring the particulate matter pollution) can be used as the sensor of the transportation vehicle for this purpose. The analysis can then comprise a comparison of this detection result (i.e., for example, at least one specific measured value) with a threshold value, so that excess pollution is detected. The analysis can also comprise a comparison of the detection result with further detection results for other partial routes (for example, road sections), in particular, for equivalent partial routes which can also be used to ascertain an alternative route. The further detection results are ascertained, for example, by external sensors and/or further transportation vehicles, and are therefore specific for a pollution of these partial routes with the at least one emission. If a partial route exists (possibly equivalent to a present partial route) which has a lower pollution than the present road section or a future planned partial route of the already ascertained route, this can be indicated by the analysis result. A route adaptation can then be carried out to change the present partial route and/or to exchange a planned partial route for the one having lower pollution, and thus to reduce the environmental pollution. It is also possible that a prediction of at least one item of pollution information is carried out for the route adaptation, and for the ascertainment of at least one equivalent partial route accompanying this. Thus, for example, pollutions which are predicted to exist in future or for the set travel time on a determined partial route can be statistically ascertained, for example, also with respect to an item of chronological information such as days of the week. The pollution information about these pollutions can possibly also be used for the analysis.

The environmental property can be specific for at least one emission of the transportation vehicle. The emission of the transportation vehicle is in this case a noise emission (sound emission of the transportation vehicle, for example, due to an engine of the transportation vehicle), or a pollutant emission, such as gas and/or particulate matter (the particulate matter which is emitted by the transportation vehicle is particularly relevant here). Liquid emissions, particulate emissions, light emissions, or the like are conceivable as further emissions. The goal of the detection of the environmental property can be primarily to evaluate a noise and/or air quality of the transportation vehicle environment. The values ascertained in this case (i.e., the detection result) can be used as the foundation for a route adaptation (i.e., for a regular, possibly instantaneous route computation of the navigation system to adapt the present route and/or select alternative partial routes). It is beneficial in this case if the route adaptation is used to avoid and/or reduce elevated and/or overelevated values of the environmental property (in terms of a traffic control and/or a traffic management). In other words, a pollution of partial routes (for example, road sections) can be reduced in that a selection of an alternative (and at least partially equivalent) partial route having lower pollution is performed by the route adaptation. Thus, for example, transportation vehicles can be redirected where lower values for noise quality and air quality and/or particulate matter exist in relation to other roads. Equivalent refers in this case to different equivalent partial routes always having an identical starting location and destination location, wherein possibly multiple partial routes form an entire route of the navigation. Pollution is understood in this case as the pollution by the at least one emission, wherein a pollution value can be specific to this. It is supposed to be below a defined permitted value (for example, based on legal requirements). The pollution value can be determined for the immediate transportation vehicle environment, for example, on the basis of the detection result, and can be determined, for example, externally on the basis of a detection by other transportation vehicles and/or sensors in the surroundings for further environments and/or partial routes. Furthermore, the externally determined pollution value can possibly be transmitted via a data transmission to an external data processing device and/or to the transportation vehicle to be able to carry out the analysis.

A special feature can be that the route adaptation is carried out at least partially automatically during the travel and/or at regular intervals. The route adaptation can also be performed independently of a navigation to a defined destination. This thus means that a manually started destination navigation does not necessarily have to be performed by the navigation system so that a route adaptation is carried out. Even without the specification of a specific destination, the navigation system can determine, for example, upcoming road sections and analyze them with respect to the pollution. Subsequently, in the case of a route adaptation, a notification can be output to the driver that a redirection is recommended, for example, if the driver presently wishes to turn off into a strongly polluted road. Therefore, in other words an instantaneous route monitoring and route adaptation can be carried out independently of a navigation to a specific destination during the travel. This is also understood as "navigation" in the scope of the disclosed method and has the benefit that a particularly environmentally-friendly travel, which protects the health of the driver, is enabled.

To evaluate the at least one emission of the transportation vehicle, the environmental property can be detected by at least one sensor of the transportation vehicle. The environmental property is specific for the at least one emission, and thus, for example, offers an indication of a degree of the pollution (for example, as a pollution value) due to the emission and/or is dependent thereon, for example, is also substantially proportionally dependent thereon. A $CO_2$ and/or $NO_2$ content of the air and/or a volume level and/or the like can be mentioned as examples of possible environmental properties. It is provided in this case that the degree of the pollution, which can be determined on the basis of the at least one environmental property, does not necessarily have to be caused by the transportation vehicle or by other transportation vehicles, so that the environmental property is specific for the emission of the transportation vehicle. Thus, for example, other causes, such as a fire or the like, can also be causal for a high value (in particular, pollution value) of the environmental property. In addition, further environmental properties can possibly also be used for the analysis, which are not specific for the transportation vehicle (for example, an item of weather information and/or time information or the like). It can also be possible that exclusively one or more such environmental properties are provided which are causally influenced by the transportation vehicle.

Furthermore, it is conceivable in the disclosed method that the analysis of the detection result is at least partially carried out by a data processing device outside the transportation vehicle, and for this purpose the detection result and/or an intermediate result of a preliminary analysis of the detection result is wirelessly transmitted to the data processing device. "Wirelessly" refers in this case to at least one transmission section of the data transmission taking place in a non-wired manner, i.e., in particular, via radio, and thus the free space being used as a transmission medium. It can be beneficial that an at least partial analysis is also already performed in the transportation vehicle, for example, by transportation vehicle electronics and/or by the navigation system. This can be executed as a preliminary analysis, so that an intermediate result is determined. Alternatively, the analysis can also be executed completely by the data processing device and/or by further external devices. For this purpose, the detection result, such as measured values of the detection or the like, has to be transmitted to the data processing device and/or the external devices. A variety of interfaces of the transportation vehicle can be used for this purpose, for example, a mobile wireless interface and/or a WLAN interface and/or another radio interface, wherein the data transmission possibly also takes place via a mobile wireless telephone and/or the Internet. The data processing device can be used in a simple manner as a central backend for the analysis of the detection result in this way, whereby a more extensive and complex processing of the detection result is possible. For example, the data processing device is designed as at least one computer and/or server or the like.

It is optionally possible that the analysis is carried out completely by the navigation system of the transportation vehicle. A route adaptation autonomously by the transportation vehicle is thus possible.

Furthermore, it is conceivable that the at least one environmental property is specific for an air quality and/or for noise quality and/or for a particulate matter emission in the environment of the transportation vehicle. In other words, the at least one environmental property can be specific for such an emission in that it enables a quantitative statement about at least one gas in the air and/or another effect of the emission (such as a volume). The pollution of the environment (i.e., the present partial route of the transportation vehicle) can thus be reliably determined.

A further benefit can be achieved if the route adaptation is regularly carried out automatically by the navigation system during the travel of the transportation vehicle. It is appropriate in autonomously driving transportation vehicles to have the route adaptation be directly performed automatically. It can also be possible that an alternative (partial) route is proposed to the driver for route adaptation. A reduction of the emissions can be achieved rapidly and with high efficiency in this way.

Furthermore, it is optionally possible in the disclosed method that the analysis comprises a comparison of at least two alternative partial routes, in particular, road sections, wherein the comparison takes place based on an item of pollution information about a pollution of these partial routes with the at least one emission. Alternatively or additionally to the items of pollution information, it is also conceivable that at least one further item of information about the partial routes is ascertained and/or taken into consideration in the analysis. These can be, for example, items of information such as weather data (snow, rain, fog, brightness) and/or a time of day and/or the like for the partial routes. It is therefore also possible to prevent transportation vehicles from being redirected onto potentially hazardous roads.

It is additionally beneficial if the analysis comprises an evaluation of the detection result to adapt the ascertained route in such a way that the pollution of the route with the at least one emission is minimized. For example, an environmentally-friendly route can be computed, in which the route is optimized on the basis of route sections (partial routes), which have lower pollution values in comparison to other route sections. For this purpose, for example, an optimization algorithm and/or a statistical processing and/or the like can be used. It can be possible that a detection of the routes taken by the transportation vehicle is persistently stored and/or transmitted to the data processing device to obtain items of information about a route history therefrom and possibly to reward the transportation vehicle owner for environmentally-friendly driving.

A further benefit can be achieved if the analysis is carried out based on at least one item of pollution information which is ascertained outside the transportation vehicle for alternative partial routes and is transmitted to a data processing device outside the transportation vehicle and/or a transmitter-receiver device of the transportation vehicle, and is specific for a present pollution of the partial routes with the at least one emission. The pollution information is ascertained, for example, in that other transportation vehicles in the respective partial routes carry out a detection of at least one environmental property (in particular, in the meaning of the disclosed method). For this purpose, respective ascertained items of detection information can be analyzed, so that a respective item of pollution information is determined. A route which efficiently reduces the pollution can thus be ascertained particularly reliably.

Furthermore, it can be provided that the analysis result is transmitted to a data processing device outside the transportation vehicle to adapt a local traffic guidance. The local traffic guidance comprises, for example, measures and/or controls which are performed outside the transportation vehicle, for example, in traffic signal systems, digital traffic signs, or the like. Not only the route of the transportation vehicle but rather also other transportation vehicles are thus to be influenced in this way. At high pollution values, strongly affected route sections (partial routes) can possibly be blocked or only transportation vehicles which do not further increase the noise quality and air quality locally can be permitted (for example, transportation vehicles having an electric drive). Such influencing of the traffic guidance can be performed, for example, by a data transmission between the transportation vehicles and/or by the control of electronic variable message signs. For example, the detection result can be automatically analyzed in the backend and thereupon a prompt automatic reaction of the local infrastructure of the affected regions can take place, i.e., the traffic guidance can be carried out. It can also be provided that messages having items of information about the traffic guidance are transmitted to the transportation vehicle and/or further transportation vehicles on the basis of the analysis in the backend, for example, which road sections and regions are to be avoided. At the same time, the analysis result of this analysis can be used to carry out a route adaptation. For this purpose, for example, alternative routes can be computed and/or proposed to a driver of the transportation vehicle, which are suitable for bypassing the partial routes influenced by the traffic guidance. It is also conceivable that a statistical analysis of the analysis result is performed by the navigation system, for example, to determine for the route adaptation on which days of the week at which times a changed traffic guidance (for example, by traffic signals and/or by entry prohibitions) is to be expected.

Furthermore, it can be provided that the local traffic guidance is carried out by an adaptation of traffic signal switches and/or dynamic redirection signs and/or dynamic traffic signs and/or electronic variable message signs and/or dynamic speed limits and/or dynamic speed regulations, to intentionally redirect the transportation vehicle and/or further transportation vehicles, so that the pollution of partial routes and/or the transportation vehicle environment with the at least one emission is reduced. The benefit can thus be achieved that a comprehensive evaluation of the pollution of various road sections is possible on the basis of the analysis result and/or further analysis results of further transportation vehicles which apply to the disclosed method. The traffic guidance can be used to reduce this pollution across the partial routes.

According to a further benefit, it can be provided that the route adaptation and/or influencing of a local traffic guidance only takes place if a pollution value dependent on the detection result exceeds a permitted value. A pollution value can thus be ascertained on the basis of the detection result (for example, a measurement result, such as a specific quantitative pollution with the corresponding emission). This can then be compared to a previously stored threshold value as a permitted value, to decide whether a route adaptation is to be carried out. In the route adaptation, it is then possible to search for partial routes which have a lower pollution to replace the present (polluted) partial route with this partial route of lower pollution for the navigation.

FIG. 1 schematically shows a transportation vehicle 1 in a top view. The transportation vehicle comprises in this case a navigation system 20, which is embodied for ascertaining at least one route and for navigation on the basis of this ascertained route based on a location of the transportation vehicle 1.

According to a disclosed method 100, a detection 210 of at least one environmental property 110 can be carried out in this case. The environmental property 110 is specific here for at least one emission of the transportation vehicle 1 into an environment 5 of the transportation vehicle 1. The detection 210 can be carried out by at least one sensor 30 of the transportation vehicle 1 to determine a detection result 211.

Figure 2:
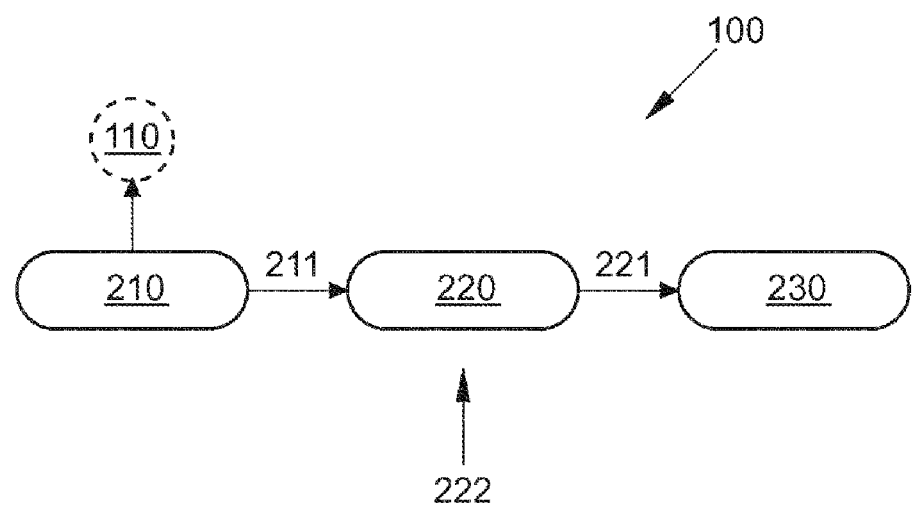
FIG. 2 shows a schematic illustration of a disclosed method sequence.

Subsequently, it can be provided that an analysis 220 of the detection result 211 is carried out to determine an analysis result 221. As shown in FIG. 2, the analysis 220 can comprise a comparison of at least two alternative partial routes, wherein the comparison is performed based on an item of pollution information 222 about a pollution of these partial routes with the at least one emission. The pollution information 222 can be ascertained, for example, via further transportation vehicles on these partial routes, i.e., other road sections.

Multiple options are conceivable for how the analysis 220 is carried out. Thus, the analysis 220 can be carried out at least partially by the transportation vehicle 1 (for example, by the navigation system 20) and/or at least partially externally from the transportation vehicle 1 by a data processing device 300. If the analysis 220 is to be carried out externally and/or if an item of pollution information 222 from other transportation vehicles is to be taken into consideration, a data transmission 120 is necessary. A transmitting-receiving device 2 of the transportation vehicle 1 for radio communication can be provided for this, for example. Furthermore, the transmitting-receiving device 2 can be electrically connected to an analysis device 3 of transportation vehicle electronics to transmit and/or analyze the data at the analysis device 3. Subsequently, the analysis result 221 can be used to carry out a route adaptation 230.

The above explanation of the exemplary embodiments describes the present disclosure exclusively in the scope of examples. Of course, individual features of the exemplary embodiments, if technically reasonable, can be freely combined with one another without leaving the scope of the present disclosure.

LIST OF REFERENCE SIGNS 1 transportation vehicle
2 transmitting-receiving device
3 analysis device
5 environment
20 navigation system
30 sensor
100 method
110 environmental property
120 data transmission
210 detection
211 detection result
220 analysis
221 analysis result
222 pollution information
230 route adaptation
300 data processing device

The invention claimed is:

1. A method for transportation vehicle navigation using a navigation system of a transportation vehicle for ascertaining and communicating at least one route for navigation based on a location of the transportation vehicle, the method comprising:
measuring at least one emission of the transportation vehicle as a detection result, by at least one sensor of the transportation vehicle;
comparing, by a processor, the detection result with further detection results measured for at least one other equivalent route, which includes comparison of at least two alternative partial routes wherein the comparison is performed based on measured detection results concerning an item of pollution information about a pollution of the at least two alternative partial routes with the measured at least one emission of the transportation vehicle to provide an analysis result;
performing route adaptation of the ascertained route during the navigation based on the analysis result to produce an alternative route including the at least one other equivalent route based on at least one of the at least two alternative partial routes; and
presenting the alternative route to a user via a user interface of the transportation vehicle during navigation.

2. The method of claim 1, wherein the analysis of the detection result is at least partially performed by a data processing device outside the transportation vehicle, and the detection result or an intermediate result of a preliminary analysis of the detection result is wirelessly transmitted to the data processing device.

3. The method of claim 1, wherein the measured at least one emission of the transportation vehicle is specific for an air quality or noise quality and/or a particulate matter emission in the environment of the transportation vehicle.

4. The method of claim 1, wherein the route adaptation is automatically performed regularly by the navigation system during the travel of the transportation vehicle.

5. The method of claim 1, wherein the analysis comprises an evaluation of the detection result to adapt the route so that the pollution of the route with the at least one emission is minimized.

6. The method of claim 1, wherein the analysis is performed based on the at least one item of pollution information, which is ascertained outside the transportation vehicle for the at least two alternative partial routes and is transmitted to a data processing device outside the transportation vehicle or a transmitting-receiving device of the transportation vehicle, and is specific for a current pollution of the partial routes with the at least one emission.

7. The method of claim 1, wherein the analysis result is transmitted to a data processing device outside the transportation vehicle to adapt a local traffic guidance.

8. The method of claim 7, wherein the local traffic guidance is performed by an adaptation of traffic signal switches and/or dynamic redirection signs or dynamic traffic signs or electronic variable message signs or dynamic speed limits or dynamic speed regulations to intentionally redirect the transportation vehicle or further transportation vehicles.

9. The method of claim 1, wherein the route adaptation or influencing of a local traffic guidance only takes place in response to a pollution value based on the detection result exceeding a permitted value.

10. A transportation vehicle comprising:
a navigation system for ascertaining and communicating for navigation at least one route based on a location of the transportation vehicle, the navigation system configured to:
measuring at least one emission of the transportation vehicle, by at least one sensor of the transportation vehicle, as a detection result;
compare the detection result with further detection results measured for at least one other equivalent route, which includes comparison of at least two alternative partial routes wherein the comparison is performed based on measured detection results concerning an item of pollution information about a pollution of the at least two alternative partial routes with the measured at least one emission of the transportation vehicle at an analysis result;
perform route adaptation of the ascertained route during the navigation based on the analysis result to produce an alternative route including the at least one other equivalent route based on at least one of the at least two alternative partial routes; and present the alternative route to a user via a user interface of the transportation vehicle during navigation.

11. The transportation vehicle of claim 10, wherein the analysis of the detection result is at least partially performed by a data processing device outside the transportation vehicle, and the detection result or an intermediate result of a preliminary analysis of the detection result is wirelessly transmitted to the data processing device.

12. The transportation vehicle of claim 10, wherein the measured at least one emission of the transportation vehicle is specific for an air quality or noise quality and/or a particulate matter emission in the environment of the transportation vehicle.

13. The transportation vehicle of claim 10, wherein the route adaptation is automatically performed regularly by the navigation system during the travel of the transportation vehicle.

14. The transportation vehicle of claim 10, wherein the analysis comprises an evaluation of the detection result to adapt the route so that the pollution of the route with the measured at least one emission of the transportation vehicle is minimized.

15. The transportation vehicle of claim 10, wherein the analysis is performed based on the at least one item of pollution information, which is ascertained outside the transportation vehicle for the at least two alternative partial routes and is transmitted to a data processing device outside the transportation vehicle or a transmitting-receiving device of the transportation vehicle, and is specific for a current pollution of the partial routes with the measured at least one emission the transportation vehicle.

16. The transportation vehicle of claim 10, wherein the analysis result is transmitted to a data processing device outside the transportation vehicle to adapt a local traffic guidance.

17. The transportation vehicle of claim 10, wherein the local traffic guidance is performed by an adaptation of traffic signal switches and/or dynamic redirection signs or dynamic traffic signs or electronic variable message signs or dynamic speed limits or dynamic speed regulations to intentionally redirect the transportation vehicle or further transportation vehicles.

18. The transportation vehicle of claim 10, wherein the route adaptation or influencing of a local traffic guidance only takes place in response to a pollution value based on the detection result exceeding a permitted value.

* * * * *